US010235363B2

(12) United States Patent
Snitko et al.

(10) Patent No.: US 10,235,363 B2
(45) Date of Patent: Mar. 19, 2019

(54) INSTANT TRANSLATION OF USER INTERFACES OF A WEB APPLICATION

(71) Applicant: SAP SE, Walldorf (DE)

(72) Inventors: Anton Snitko, Griesheim (DE); Michail Vasiltschenko, Schriesheim (DE); Ralph Debusmann, Ludwigsburg (DE)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 15/499,928

(22) Filed: Apr. 28, 2017

(65) Prior Publication Data
US 2018/0314688 A1 Nov. 1, 2018

(51) Int. Cl.
G06F 17/28 (2006.01)
G06F 17/24 (2006.01)
G06F 17/27 (2006.01)
G06F 3/0482 (2013.01)

(52) U.S. Cl.
CPC .......... *G06F 17/289* (2013.01); *G06F 3/0482* (2013.01); *G06F 17/24* (2013.01); *G06F 17/274* (2013.01); *G06F 17/2785* (2013.01)

(58) Field of Classification Search
None
See application file for complete search history.

(56) References Cited

U.S. PATENT DOCUMENTS

| | | | |
|---|---|---|---|
| 8,126,702 B2 | 2/2012 | Lang et al. | |
| 8,442,811 B1 * | 5/2013 | Broniek | G06F 17/24 379/387.01 |
| 8,630,838 B2 | 1/2014 | Jackson | |
| 8,942,973 B2 * | 1/2015 | Viswanathan | G06F 17/277 704/277 |
| 9,081,769 B2 | 7/2015 | Liu et al. | |
| 9,298,703 B2 | 3/2016 | Leydon et al. | |
| 9,323,746 B2 | 4/2016 | Bangalore et al. | |
| 9,659,009 B2 * | 5/2017 | Ni | G06F 17/289 |
| 2006/0184352 A1 * | 8/2006 | Chen | G06F 17/2863 704/2 |
| 2007/0094024 A1 * | 4/2007 | Kristensson | G06F 3/0237 704/252 |
| 2008/0195372 A1 * | 8/2008 | Chin | G06F 3/0481 704/2 |
| 2010/0286977 A1 * | 11/2010 | Chin | G06F 17/289 704/4 |
| 2012/0005571 A1 * | 1/2012 | Tang | G06F 17/289 715/234 |
| 2012/0123765 A1 * | 5/2012 | Estelle | G06F 17/277 704/3 |

(Continued)

*Primary Examiner* — Douglas Godbold
(74) *Attorney, Agent, or Firm* — Fish & Richardson P.C.

(57) ABSTRACT

Various embodiments of systems, computer program products, and methods to provide instant translation of user interfaces of a web application are described herein. In an aspect, a request is received to translate a user interfaces of a web application from a source language to a target language. A translatable user interface element associated with the user interface of the web application is determined. Further, the translatable user interface element is translated from the source language to the target language based on dynamic metadata associated with the translatable user interface element. The translated translatable user interface element in the user interface of the web application is rendered.

20 Claims, 8 Drawing Sheets

(56) References Cited

U.S. PATENT DOCUMENTS

| | | | |
|---|---|---|---|
| 2013/0124186 A1* | 5/2013 | Donabedian | G06F 17/289 |
| | | | 704/2 |
| 2013/0173247 A1 | 7/2013 | Hodson | |
| 2014/0372098 A1 | 12/2014 | Arseniev et al. | |
| 2015/0169551 A1* | 6/2015 | Yun | G06F 8/38 |
| | | | 704/2 |
| 2015/0261880 A1 | 9/2015 | Luo et al. | |
| 2015/0378990 A1* | 12/2015 | Martinez Corria | G06F 17/289 |
| | | | 704/2 |
| 2016/0085746 A1* | 3/2016 | Ni | G06F 17/289 |
| | | | 704/2 |
| 2016/0259781 A1 | 9/2016 | Nuggehalli | |
| 2017/0192963 A1* | 7/2017 | Ni | G06F 17/289 |

\* cited by examiner

```
def translate(text: String, sourceLanguage: SourceLanguage,
targetLanguage: TargetLanguage, logisticRegressionClassifier:
LogisticRegressionClassifier) = {                                    ⎫
                                                                     ⎬ 310
    // GET DYNAMIC METADATA FOR THE TEXT (GIVEN THE
    PROVIDED SOURCE/TARGET LANGUAGE PAIR).

Val dynamicMetadata = getDynamicMetadata(text,          ⎫ 320
    sourceLanguage, targetLanguage)                         ⎭

// GET THE POSSIBLE TRANSLATIONS OF THE TEXT (GIVEN
    THE PROVIDED SOURCE/TARGET LANGUAGE PAIR).

val possibleTranslations = getPossibleTranslations(text,   ⎫ 330
    sourceLanguage, targetLanguage)                            ⎭

// USE THE LOGISTIC REGRESSION CLASSIFIER ON THE
    TEXT, THE DYNAMIC METADATA, TO SELECT THE BEST AMONG
    THE SET OF POSSIBLE TRANSLATIONS.

val bestTranslation = logisticRegressionClassifier(text,   ⎫
    dynamicMetadata, possibleTranslations, sourceLanguage,     ⎬ 340
    targetLanguage)                                            ⎭

// RETURN THE BEST TRANSLATION.

bestTranslation                         ⎱ 350
}
```

| SEARCH TEXT 🔍 | STATUS: ☐ NEW ☐ GOOD ☐ BAD | |
|---|---|---|
| ACTION | SOURCE | TARGET |
| (IMPROVE) (GOOD) (BAD) | PURCHASE ORDER | Поръчка |
| (IMPROVE) (GOOD) (BAD) | ERROR | грешка |
| (IMPROVE) (GOOD) (BAD) | ONE | един |
| (IMPROVE) (GOOD) (BAD) | ONE | един |
| (IMPROVE) (GOOD) (BAD) | AUTOMATED | автоматизирано |

INSTANT TRANSLATION OF USER INTERFACES OF A WEB APPLICATION

BACKGROUND

A web application is a client-server application in which a client (i.e., user interface) runs in a web browser. It is advantageous if the web application supports multiple country language versions as the demand for such web applications has increased throughout the world. Thereby, the surge of growth in Internet usage across the world has created the need for multilingual web applications.

For web applications to be effectively used in multiple countries, the development of the web applications requires translation. Translation of web applications to different languages may use several techniques. One of the techniques may involve managing the translation process by human translators. The process of having an application translated into another language by human translators may be tedious such as providing an export of text from the web application in human-readable form for translation to the translation service. Further, the context of the text to be translated is communicated to translating agents working for a translation service and the translated text is imported into the original application once the translation is completed. Also, multiple versions of the web application are distributed and maintained to provide the web application in multiple languages. Another technique may include re-architecting the existing website backend technology to accommodate multiple languages, which may be complex.

Yet another technique involves machine translation, which is often error prone, particularly where the text to be translated has a minimal context (e.g., brief sentence construction). Additionally, machine translations may often have trouble with abbreviations, acronyms, diminutives, colloquial words/phrases, proper nouns, and/or common nouns.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to provide instant translation of user interfaces associated with a web application are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted. Further, it is to be understood that the various actions (receiving, determining, retrieving, rendering, and so on) may be performed by a hardware device (e.g., computing system), even if the action may be authorized, initiated or triggered by a user, or even if the hardware device is controlled by a computer program, software, firmware, and the like.

Figure 1:
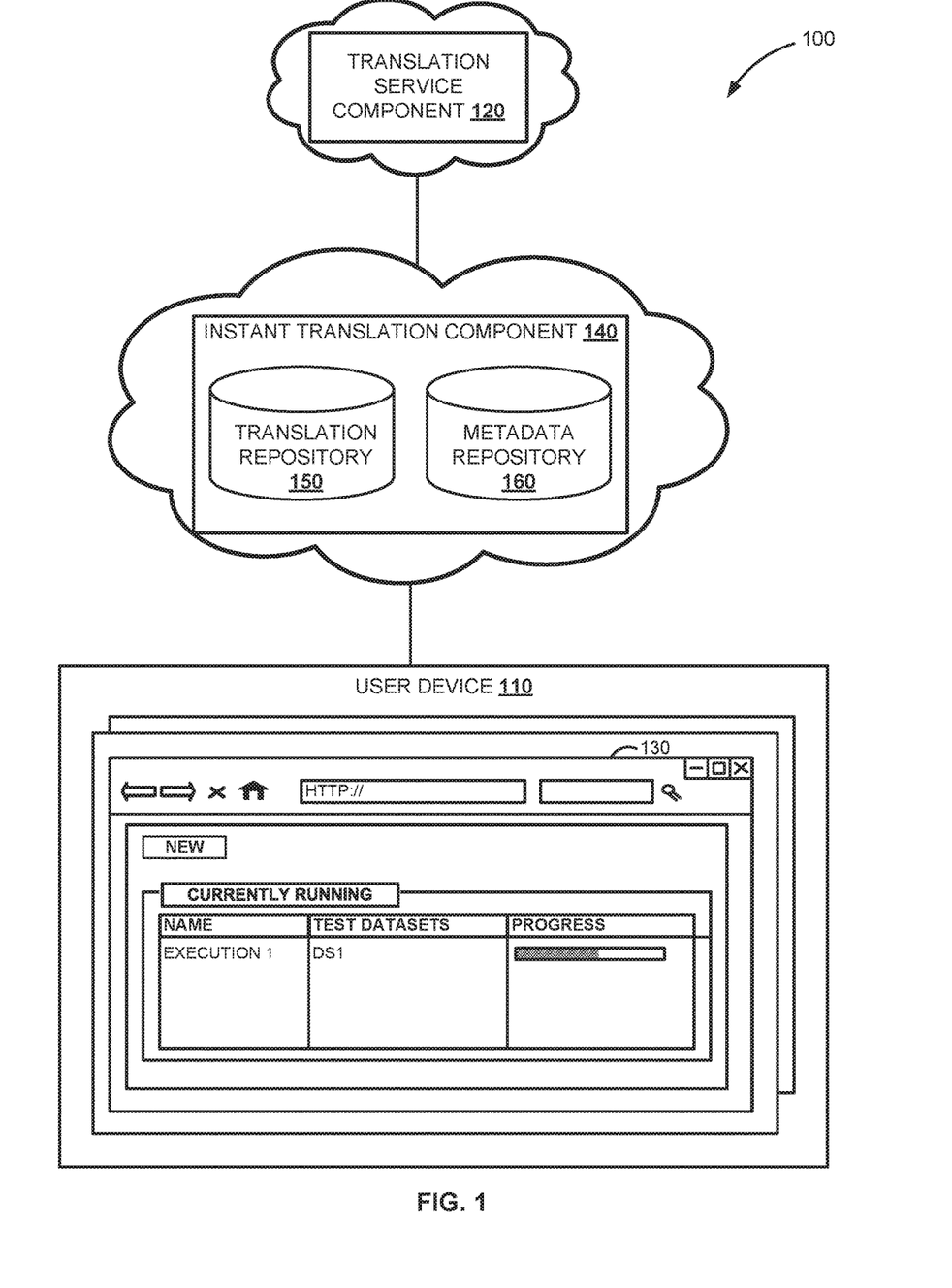
FIG. 1 is a block diagram of a computing environment illustrating instant translation of user interfaces of a web application, according to one embodiment.

FIG. 1 is a block diagram of computing environment 100 illustrating instant translation of user interfaces of a web application, according to one embodiment. The computing environment 100 may include one or more client/user/computing devices (e.g., user device 110) configured to execute one or more web applications. Examples of the user device 110 may include, but are not limited to a desktop computer, a laptop computer, a tablet computer, or a mobile phone.

The web application is a software application executable by a web browser at the user device 110. The web application can be coded in a browser-supported programming language, such as JavaScript®. The web application can also be associated with a browser-rendered markup language, such as hypertext markup language (HTML). Further, the web application may include one or more user interfaces or website screens accessed via the web browser by a user over the Internet. One such user interface (e.g., 130) is shown in FIG. 1. The user interface may refer to an interactive area of the web application where content is displayed and/or input is received. The user interface may include user interface elements such as, but not limited to, text segments, image files, audio clips, video clips, files, 3D graphics or any combination thereof.

A developer may use a natural language (e.g., English, French, German, Chinese, Russian, Spanish, Polish or other natural language) to develop the user interfaces of the web application. Users of different natural languages, however, may be unable to utilize the web application unless the user interface is translated to their natural language. Thereby, the user device 110 can be configured to communicate with cloud based translation service providers (e.g., translation service component 120) via a communication network. The communication network can include a wide area network (WAN). e.g., the Internet.

The translation service component 120 translates the user interfaces of the web application. Providers of such service components include, but are not limited to SAP® (e.g., SAP translation hub), Yandex®, Google®, or Bing®. The translation provided by the translation service component 120 may not be controlled by the user (e.g., they do not incorporate user feedback or interaction) and the precision of the translation may be uncertain with respect to context of the web application.

In one embodiment, to improve the translations provided by the translation service component 120, the computing environment 100 may include instant translation component 140 to translate the user interfaces of the web application instantly based on a list of properties of dynamic metadata associated with the user interface elements. The dynamic metadata may include properties, which aid the translation of the user interfaces. For example, the dynamic metadata may include, but not limited to, domain, specific domain information, text type, part-of-speech, terminology, context-based information associated with the web application, and/or information derived from Mockups, which are described in greater detail with examples in FIG. 2. In one embodiment, in a process of web application translation, the list of properties can be dynamically extended by anyone in the process chain, for example, the developers, information developers, testers and users (e.g., consumers).

In one embodiment, the instant translation component 140 may include translation repository 150 to store translation of the user interfaces of the web application and metadata repository 160 to store the dynamic metadata associated with different users, different businesses and different domains. Further, the translation repository 150 and the metadata repository 160 may be deployed on cloud (e.g., as shown in FIG. 1) or on premise. Translation services could be used not only at a client site (e.g., browser JavaScript® library), but also on a server site of the web application allowing faster access to translation.

In one embodiment, upon translation, the user may be allowed to revise the translation and/or provide feedback on the translation. Further, the feedback may be considered for updating the translations. Hence, the instant translation may provide better or high rated translations for the user interface elements and thus the user interfaces. By combining the dynamic metadata and the user feedback/interaction with the cloud translation services, the quality of the translation can be improved. Also, costs are decreased by eliminating the need to translate user interfaces of web applications into a plurality of different languages at a software code level.

Figure 2:
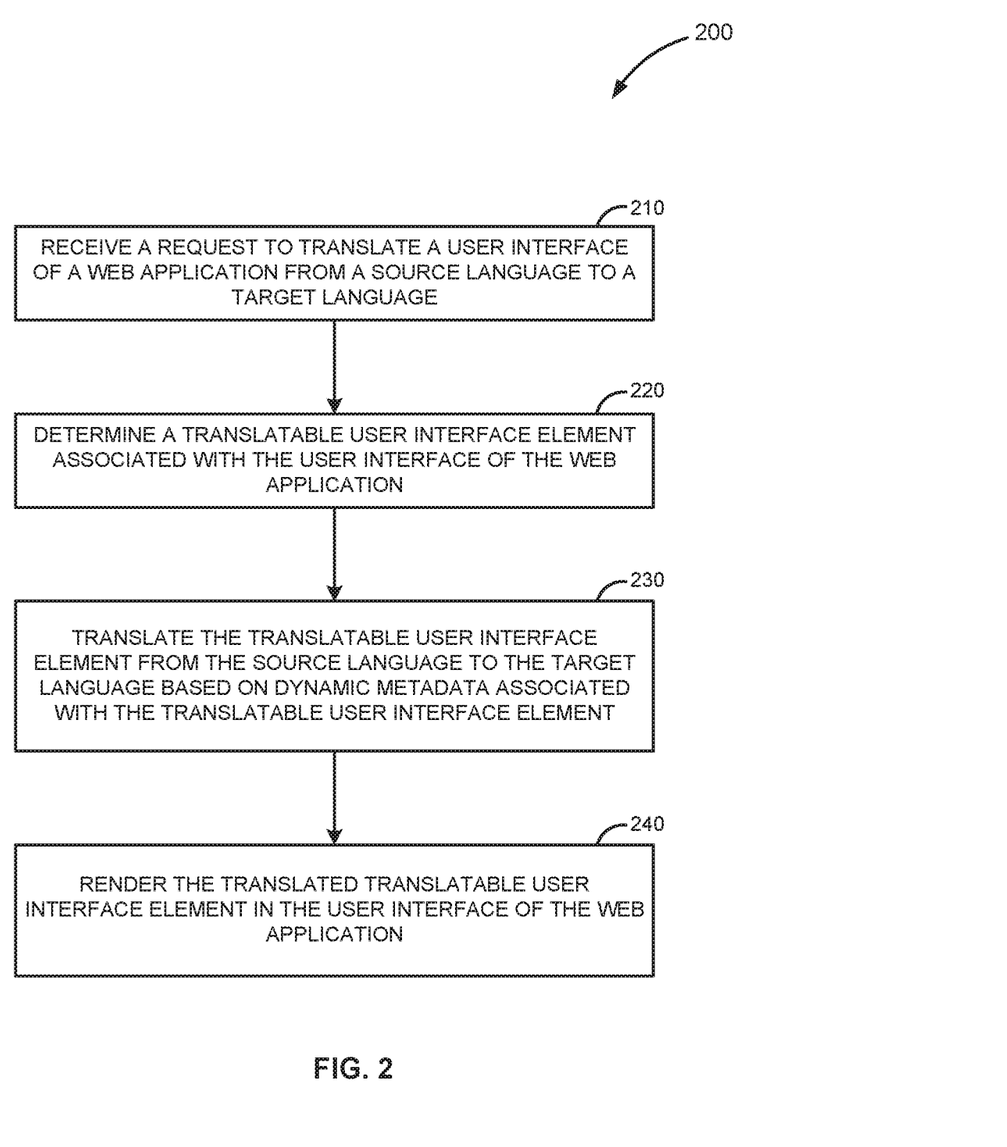
FIG. 2 is a flow diagram illustrating an example process to provide instant translation of user interfaces of a web application, according to an embodiment.

FIG. 2 is a flow diagram illustrating example process 200 to provide instant translation of user interfaces of a web application, according to an embodiment. At 210, a request is received to translate a user interface of the web application from a source language to a target language. For example, the request may be generated by web browser software executing on a user device. The request may be generated in response to loading the user interface associated with the web application. In one example, the request is a hypertext markup language (HTML) request that includes information, for example, metadata, indicative of the natural language (e.g., the source language) associated with the request.

At 220, a translatable user interface element associated with the user interface of the web application is determined. In one embodiment, translatable user interface elements and untranslatable user interface elements are defined at least by a developer while developing the web application and a user of the web application. For example, during development of the web application, developer or designer may select the user interface elements or regions or controls of the web application where translations can be or cannot be performed (e.g., using HTML tags, scripts, and the like). Further, the developer may provide translation identifiers (e.g., via HTML attributes) for the user interface elements that need to be translated which would help to find the translation when the design of the user interface changes. Also, a user may select the user interface elements of web application where translations can or cannot be performed directly on the running web application in the browser. The translatable user interface elements can be, but are not limited to, text segments, image files with texts to be translated, audio clips, video clips with audio to be translated, files with texts to be translated, 3D graphics or any combination thereof.

At 230, the translatable user interface element is translated from the source language to the target language based on dynamic metadata associated with the translatable user interface element. For example, an instant translation component translates the translatable user interface element based on translation provided by a translation service component and the dynamic metadata. The dynamic metadata may include properties, which aid the translation of the user interfaces of the web application. For example, the dynamic metadata may include, but not limited to, domain, specific domain information, text type, part-of-speech, terminology, context-based information associated with the web application, and/or information derived from Mockups.

The domain can be referred to as a subject area or a concept or a topic or a particular area. For example, a domain can be, but not limited to, an application domain (e.g. "finance" domain), a product (e.g. "SAP® Business ByDesign®"), a company activity (e.g. "marketing"), and a company organizational unit (e.g. "Ariba®"). Other examples for the domain can be, but not limited to "payroll" domain, "Customer relationship management" domain, "human resource" domain, "sales" domain, "medical" domain, "auto-parts" domain, "education" domain, and "travel" domain. Specific domain information may include specific information of a domain. For example, in the domain "customer relationship management" (CRM), "customer acquisition" is one of specific area, or in the domain "medical", "patient relations" can be a specific area. User interfaces may include different types of user interface elements, referred as text types. For example, the text type can be, but not limited to a message, a button, a column header, a table, and a pull down menu. Further, the dynamic metadata may include part-of-speech associated with the user interface elements describing a category to which a word is assigned in accordance with syntactic functions. For example, noun, pronoun, adjective, determiner, verb, adverb, preposition, conjunction, and interjection. Terminology in the dynamic metadata describes meaning of terms in different domains. For example, a term "well" may have different meaning in "oil" and in "building"/"construction"

industries or domains with different translations into other languages. Context-based information associated with the web application define texts that are part of an address form, for instance. Information derived from Mockups may include prototypes of the user interfaces, which may aid in the translation. Mockups can provide information about the proximity of the user interface elements of the user interface and relationships between the user interface elements (e.g., parent-child relationships).

For example, the dynamic metadata may be stored in a key-value database, where a set of keys can be extensible. The key-value database or key-value store, is a data storage paradigm designed for storing, retrieving, and managing a data structure more commonly known as a dictionary or hash. A key-value pair (KVP) is a set of two linked data items: a key, which is a unique identifier for an item of data, and the value, which is either the data that is identified or a pointer to the location of the data.

In one embodiment, in a process of user interface translation, the list of properties can be dynamically extended by anyone in the process chain, for example, the developers, information developers, testers and end-users. For example, translations are retrieved from cloud services (e.g., translation service component) and the dynamic metadata is considered for determining better or high rated translations of the user interface elements. For example, the instant translation component may make use of linguistic information such as part-of-speech tags to find out how to translate a user interface element of the user interface. When the source language is English, for instance, a word such as "book" can mean different if it is a verb or a noun. As a verb, it means "to book" in the sense of "to book a hotel", whereas as a noun, it means "book" in the sense of "book" (e.g., which can be read). The dynamic metadata may be used to establish context of the user interface elements in a concise way. Hence, the concise context then allows to find the right translations for the user interface elements.

At 240, the translated user interface element is rendered in the user interface of the web application. Hence, the rendered user interface may include translated translatable user interface elements and untranslatable user interface elements. Upon translation, the translations are stored in a translation repository in the cloud to enable instant translation of the user interfaces in the future, for example. Further, the dynamic metadata may be stored in a metadata repository. In one embodiment, the translation of the web application can be improved or revised, as described in FIGS. 4 and 5.

Figure 3:
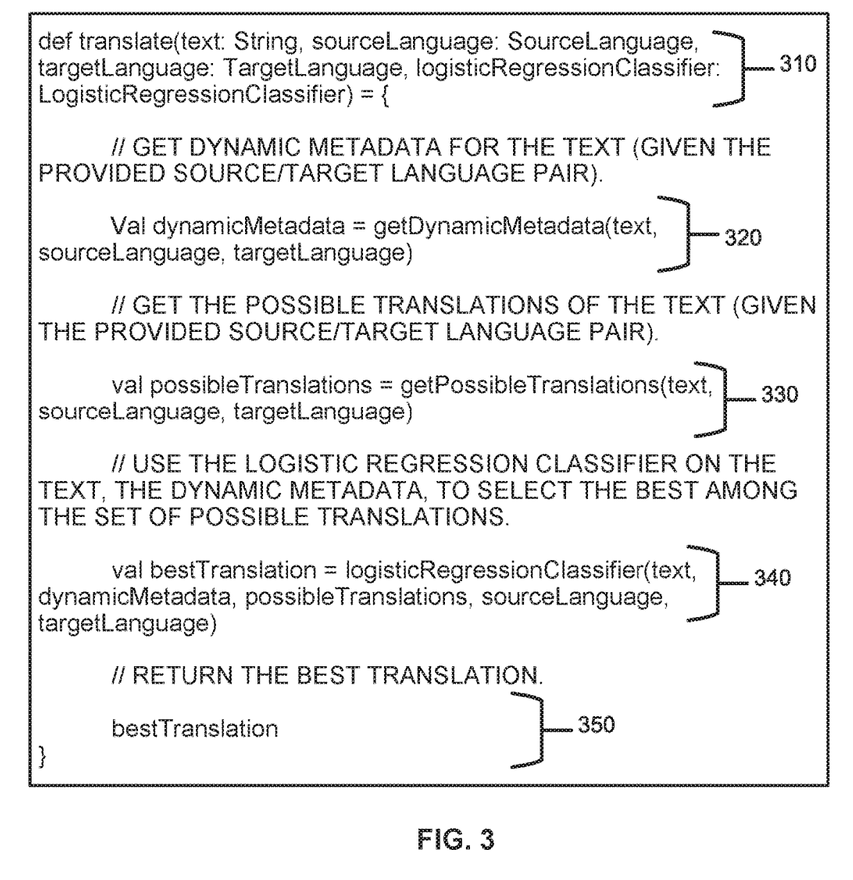
FIG. 3 is an exemplary pseudocode implementation to provide instant translation of user interfaces of a web application, according to an embodiment.

FIG. 3 is an exemplary pseudocode implementation to provide instant translation of user interfaces of a web application, according to an embodiment. At 310, a request to translate a user interface associated with the web application from a source language to a target language is received. Further, a translatable user interface element associated with the user interface is determined. For example, the translatable user interface element can be, but not limited to textual language associated with pull down menu selections, radio button labels, and selectable icon. At 320, dynamic metadata associated with the translatable user interface element of the user interface is retrieved.

In one embodiment, one or more possible translations of the user interface element are retrieved based on the dynamic metadata as in 330. Further, better or high rated translation of the translatable user interface element is determined from the retrieved possible translations. In one example, logistic regression may be applied for machine learning to select high rated translation from the possible translations as in 340. For example, training data can be a selection of 100 user interface elements and a set of possible translations of them. Further, the logistic regression may decide, based on a set of properties/attributes/tags describing the context (e.g., the dynamic metadata), which of the possible translations is the best one in the given context (e.g., for a given language pair consisting of source and target languages). At 350, the user interface with the translated translatable user interface element in the target language is rendered.

Figure 4:
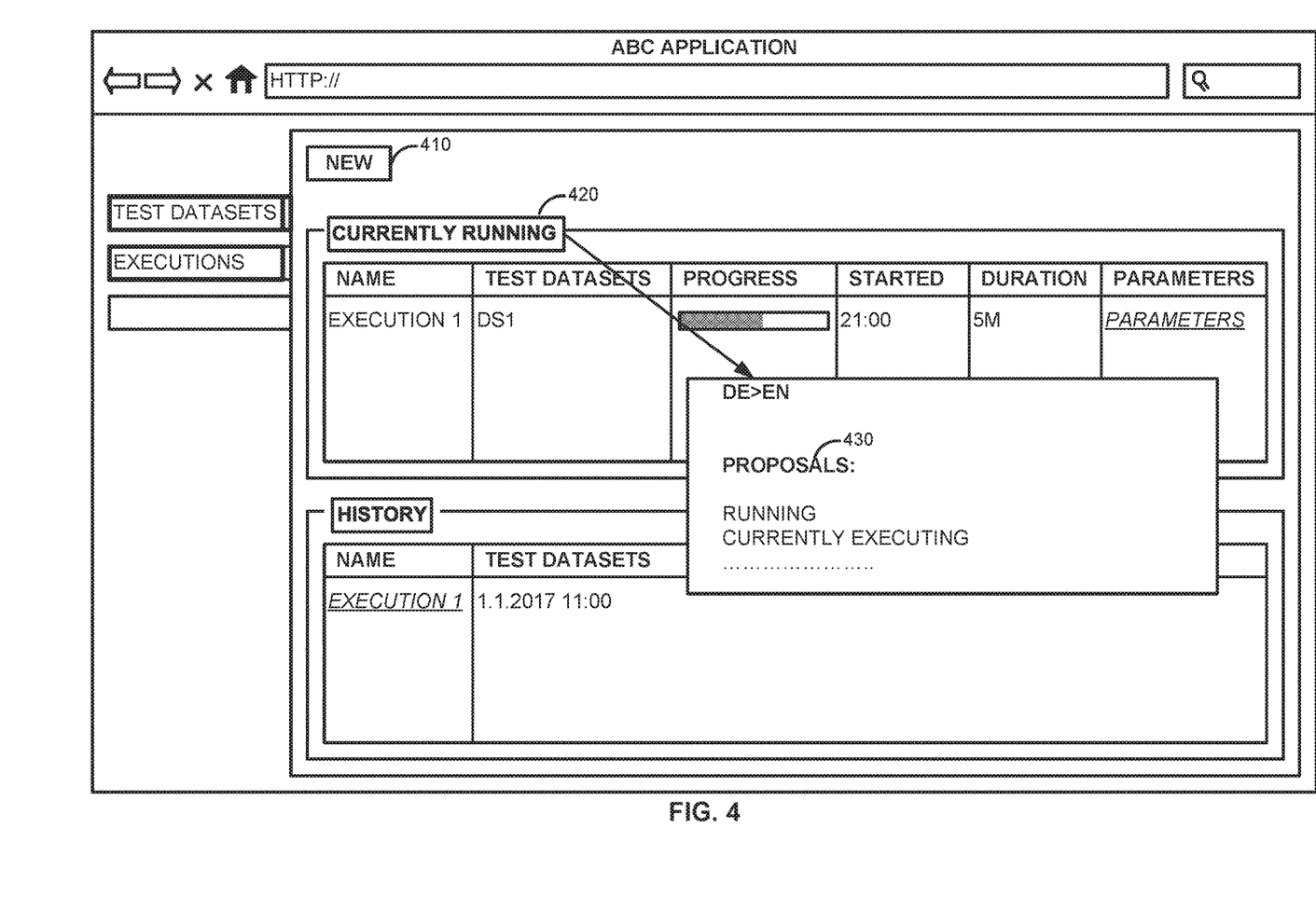
FIG. 4 illustrates an example translated user interface associated with a web application, according to an embodiment.

FIG. 4 illustrates an example translated user interface associated with a web application, according to an embodiment. The example translated user interface displays translated user interface elements from German language (source language) to English language (target language). Further, the translated user interface elements are highlighted in the user interface (e.g., 410 and 420).

In one embodiment, upon translation, different proposals are provided for the highlighted user interface elements to revise or improve the translation directly in the browser. For example, when a highlighted user interface element (e.g., 420) is selected, a pop-up window is displayed. In the pop-up window, source language (e.g., Germany (DE)) and target language (e.g., English (EN)) are specified, which can be used to instantly switch between languages. Further, different proposals (e.g., 430) for the highlighted user interface element are displayed. The user can choose between variants/multiple proposals that the translation services provide if the first-shot translation is not sufficient. Thereby, the texts may be translated into user-preferred translations. Also, users can edit the proposals directly in-context. The user can improve, create translation or select proposal directly on the user interface. Further, based on the selection of the provided proposals, the displayed user interface of the web application may be updated. Also, the revised or updated translations are pushed back to a translation repository associated with the user and may be used for further translation of the web application.

Figure 5:
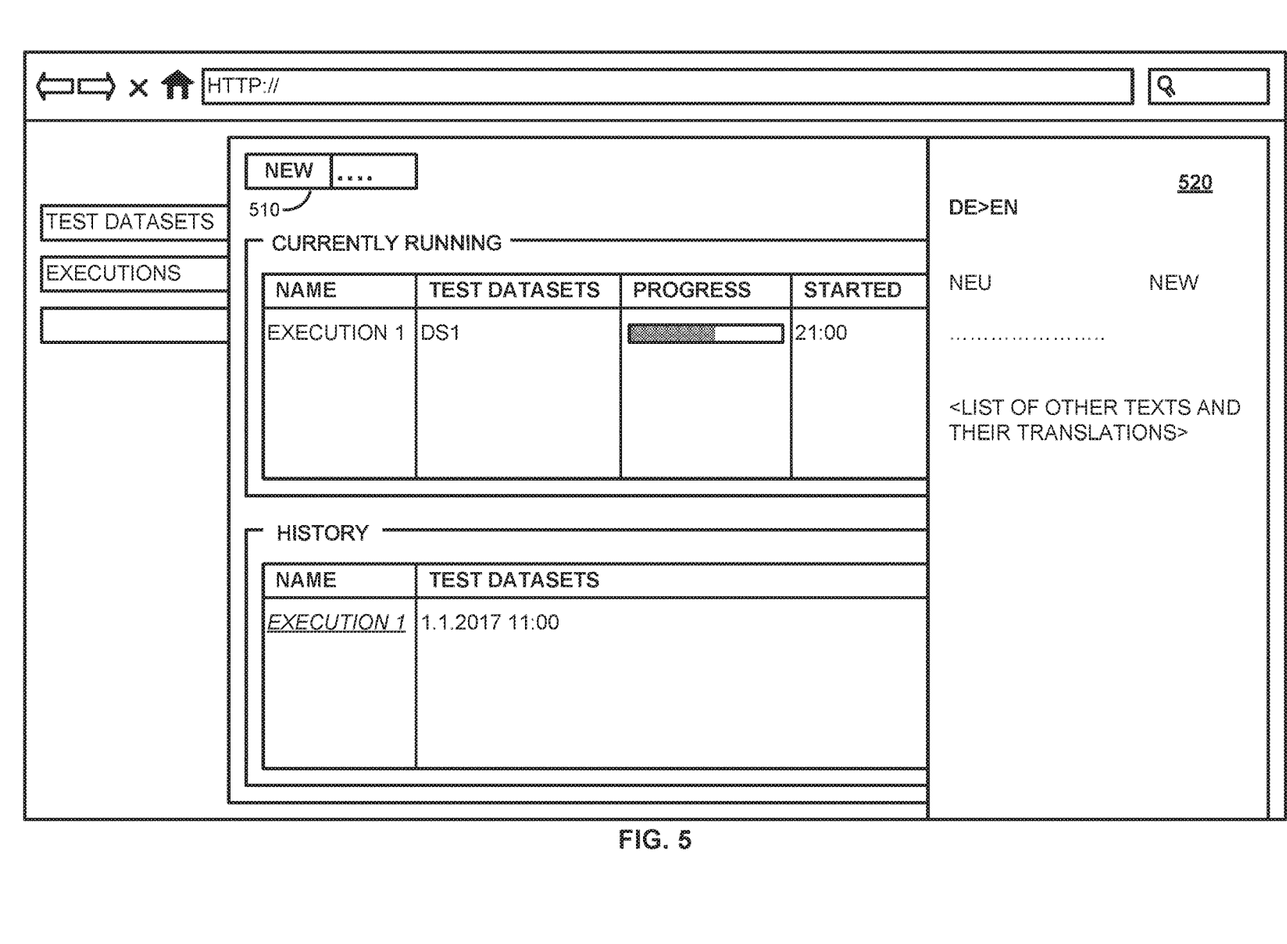
FIG. 5 illustrates an example translated user interface associated with a web application with translated user interface elements, according to an embodiment.

FIG. 5 illustrates an example translated user interface associated with a web application with translated user interface elements, according to an embodiment. The example translated user interface displays translated user interface elements from German language (source language) to English language (target language). In one embodiment, when a highlighted user interface element is selected (e.g., 510), a pop-up window or a separated view is displayed. For example, in the pop-up window (e.g., 520), source and target languages are specified. Further, an editable list of translatable user interface elements and the associated translated user interface elements is provided to revise the translated user interface elements. For example, overview of all texts for the whole web application or for a particular user interface page can be displayed. The list can be revised or edited to perform improvements to translations. Hence, the web application can be translated to any languages and users may improve translation without need of a translator.

Figure 6:
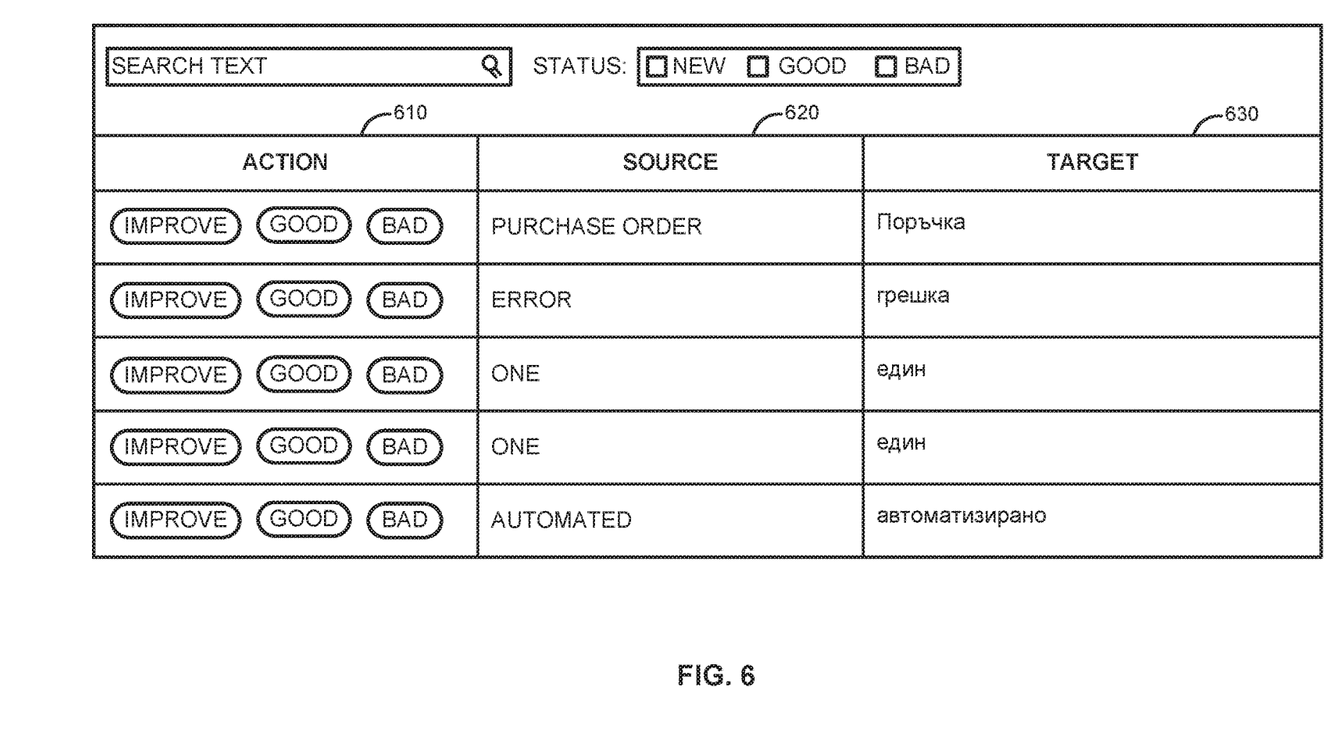
FIG. 6 illustrates an example user interface to provide feedback of translation of user interfaces of a web application, according to an embodiment.

FIG. 6 illustrates an example user interface to provide feedback of translation of user interfaces of a web application, according to an embodiment. Feedbacks relating to translation of web application may be composed, which in turn can improve the translation of the web application. For example, a list of texts associated with a source language (e.g., 620) and a list of translated texts associated with a target language (e.g., 630) are displayed. Further, action (e.g., 610) to provide feedback for the translation is displayed. Based on the feedback, a translation repository can be updated. For example, when the action "improve" is selected, a pop-up window may open to accept an improvement for the translated text. When the action "bad" is selected, the translated text is considered as bad translation, which may be considered for later improvement. Hence, expert feedback can come in many forms such as the expert may have already translated the user interfaces of an earlier version of the web application and just knows that a particular user interface element has to be translated in an unorthodox fashion.

In one embodiment, the previous translations can be captured in the instant translations component, such as in the associated repositories (e.g., a translation repository and a metadata repository), for future translation recollection. In one such example, the user selects from multiple presented translations which are displayed in subsequent translations of the user interface. In another embodiment, the user selects an edit icon (not shown) to edit the presented onscreen translation to a user entered textual translation. In one such example, the data in the instant translation component can be updated to reflect user, industry, or company specific translations, for present and or future translations. With the captured data, translations that might otherwise be more general, become specific to users, industries, companies, education, and or other more specific domains of expertise. Thereby, user/expert feedback on translations can be accommodated in real time.

Figure 7:
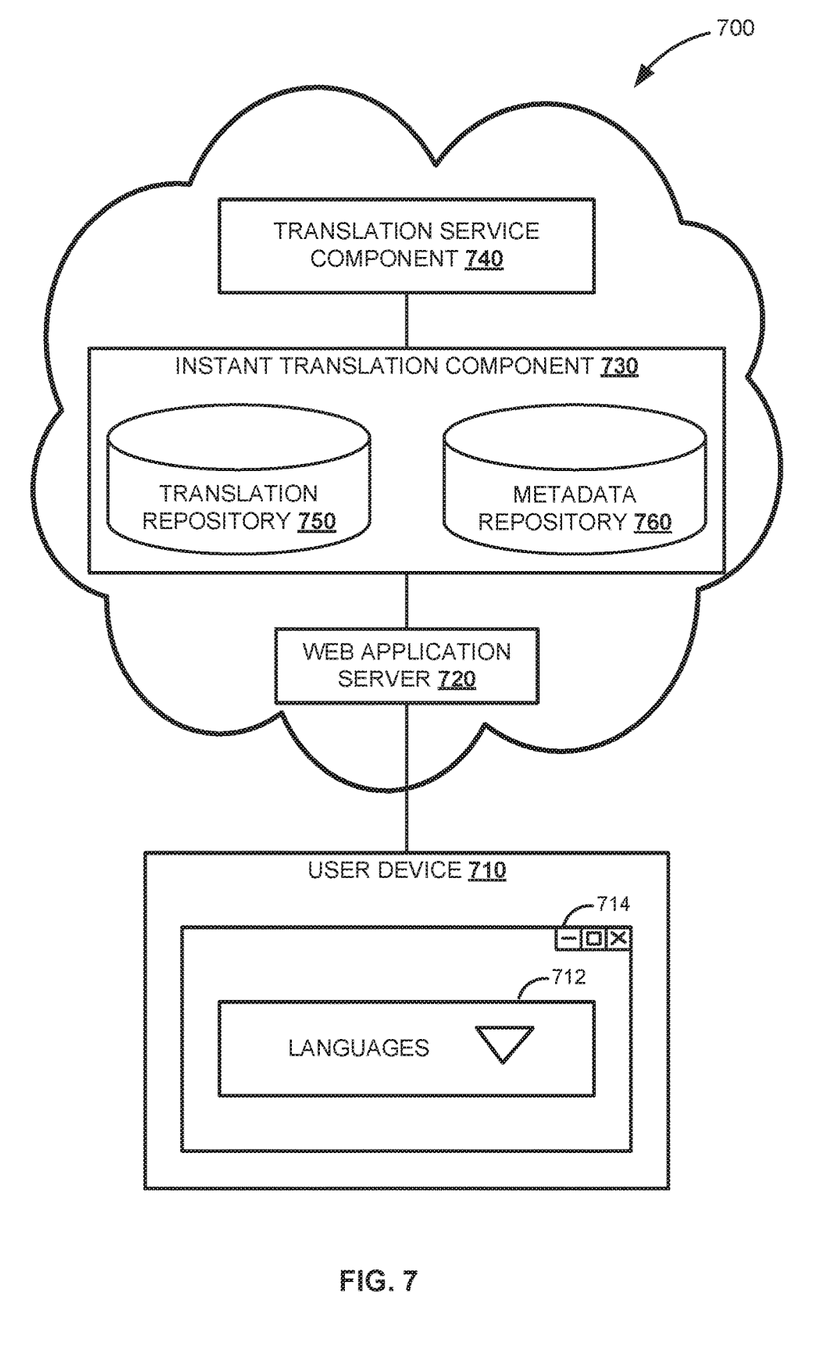
FIG. 7 is a block diagram of a computing environment illustrating instant translation of user interfaces of a web application, according to one embodiment.

FIG. 7 is a block diagram of a computing environment illustrating instant translation of user interfaces of a web application, according to one embodiment. The computing environment 700 may include one or more client devices (e.g., user device 710) configured to execute one or more web applications. Web application server 720 may create or stream content of a web application displayed at the web browser. Further, the web application server 720 is communicatively connected to instant translation component 730 and translation service component 740 as shown in FIG. 7. In one embodiment, the instant translation component 730 may include translation repository 750 to store translations of user interfaces associated with different users and the web applications, and metadata repository 760 to store properties of user interface elements associated with the user interfaces.

During runtime of the web application in the user device 720, an option is provided to display the user interfaces of the web application 720 in different languages. The option can be, but not limited to a user interface element (e.g., an icon or pull down menu 712) in the displayed user interface 714 or change in Uniform Resource Locator (URL) of the user interface 714. When a user utilizes the user interface element 712 and selects a language (e.g., Spanish) other than a language (e.g., English) in which the user interface 714 is presently displayed, the web application receives the language selection from the user device 710 and may call the instant translation component 730 to translate the user interfaces from English language to Spanish language. In one embodiment, the instant translation component 730 may use the translations stored in the translation repository 750, if the user interface was translated in past, to display the user interface 714 in Spanish language. When the translations are not present in the translation repository 750, the translations of the user interface elements associated with the user interface 714 are retrieved from the translation service component 740. Further, the translations for the user interface elements are chosen based on dynamic metadata associated with the user interface elements, which are stored in the metadata repository 760, to determine the translations for the user interface elements of the user interface 714. The translated user interface 714 is displayed in the user device 710.

In one such embodiment, since the translation repository 750 and the metadata depository 760 has data corresponding to previous domain related (e.g., transportation, medical, scientific, business domains, and the like) translations associated with the user that had been confirmed and/or altered by domain specific users and experts in previous runtime translations, the translations provided are more reliable that they would have been had the translation service component 740 alone been utilized. These highly relevant domain specific translations, along with any more traditional translations from the translation service component, are streamed back to the web application server 720, which forwards the translated user interface 714 to be displayed at the user device 710 in the language selected by the user via the user interface element 712.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
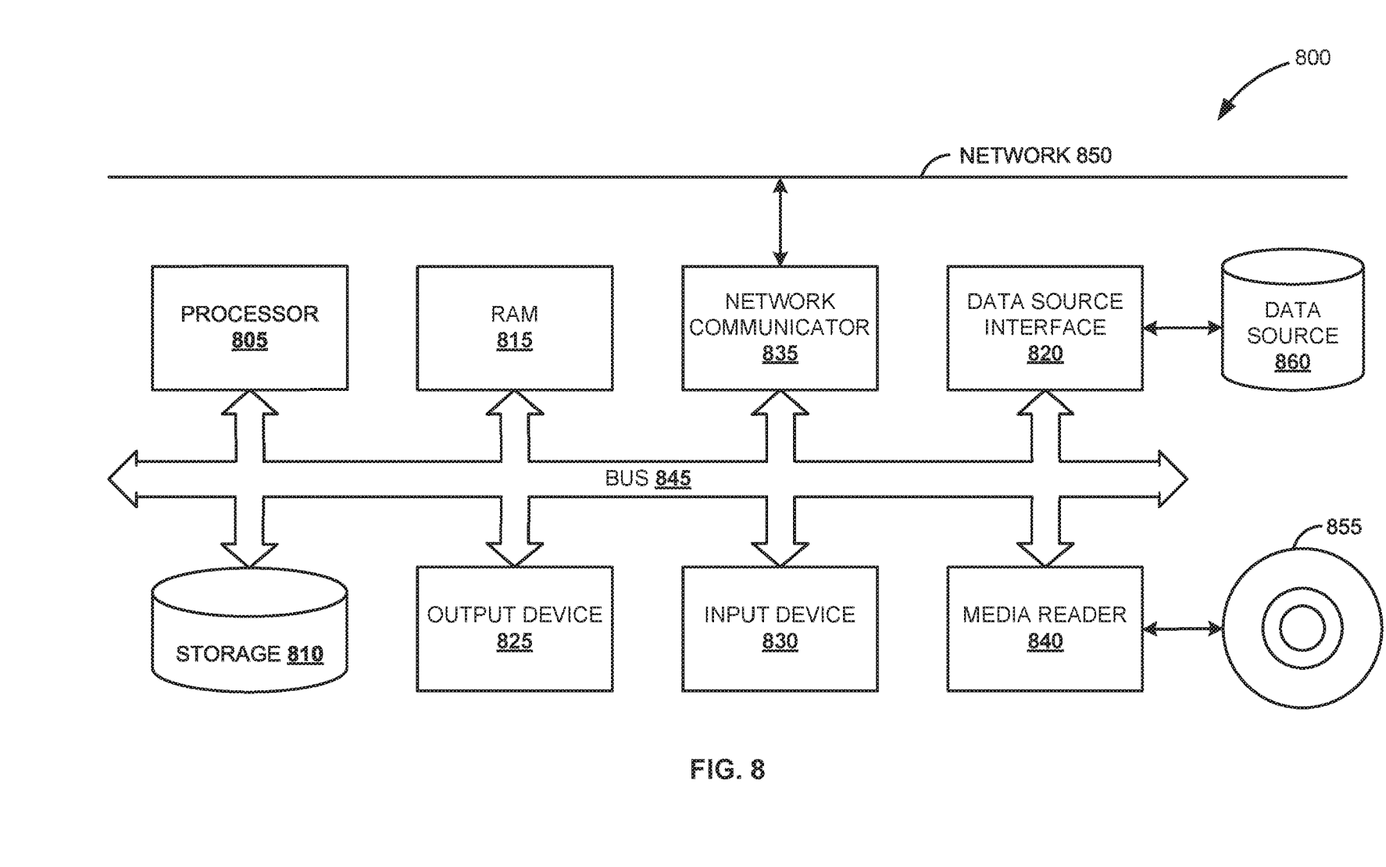
FIG. 8 is a block diagram illustrating an example computer system, according to an embodiment.

FIG. 8 is a block diagram of example computer system 800, according to an embodiment. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. One or more of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments, the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to:
    receive a request to translate a user interface of a web application from a source language to a target language;
    determine a translatable user interface element associated with the user interface;
    translate the translatable user interface element from the source language to the target language based on dynamic metadata associated with the translatable user interface element;
    render the translated translatable user interface element in the user interface of the web application;
    highlight the translated user interface element on the rendered user interface;
    provide selectable different proposals for the highlighted user interface element;
    receive a selection by a user of one of the different proposals;
    receive an edit from the user to the selected proposal to improve the translation of the translated user interface element and future translations; and
    update the rendered user interface based on the edit to the selected proposal.

2. The non-transitory computer-readable medium of claim 1, wherein the translatable user interface element is defined at least by a developer while developing the web application and a user of the web application.

3. The non-transitory computer-readable medium of claim 1, wherein the dynamic metadata comprises at least one of domain, specific domain information, a text type, part-ofspeech, terminology, context-based information associated with the web application, and information derived from Mockups.

4. The non-transitory computer-readable medium of claim 1, wherein the translatable user interface element comprises a text segment, an image file, an audio clip, a video clip, files, 3D graphics, or any combination thereof.

5. The non-transitory computer-readable medium of claim 1, further comprising instructions, which when executed by the computer cause the computer to:
provide an editable list of translatable user interface elements and associated translated user interface elements associated with the web application.

6. The non-transitory computer-readable medium of claim 1, further comprising instructions, which when executed by the computer cause the computer to:
store the dynamic metadata in a metadata repository and the translated user interface element in a translation repository associated with a user.

7. The non-transitory computer-readable medium of claim 6, wherein the edit to the selection of the one of the different proposals is stored in the translation repository associated with the user.

8. The non-transitory computer-readable medium of claim 1, further comprising:
retrieve one or more translations of the translatable user interface element based on dynamic metadata associated with the translatable user interface element;
determine a high rated translation for the translatable user interface element from the retrieved one or more translations; and
display the high rated translation for the translatable user interface element in the user interface of the web application.

9. The non-transitory computer-readable medium of claim 1, further comprising:
providing a feedback menu to the user for the one or more translations on the web application, wherein the feedback menu comprises an action for the user to rank a translation, a description of the source language, and a description of the target language; and
receiving an indication from the user for ranking each of the one or more translations, wherein the response corresponds to action for the translation comprising an improved translation, a good translation, and a bad translation.

10. A computer implemented method to provide instant translation of user interfaces of a web application, comprising:
receiving a request to translate a user interface of the web application from a source language to a target language;
determining a translatable user interface element associated with the user interface;
translating the translatable user interface element from the source language to the target language based on dynamic metadata associated with the translatable user interface element;
rendering the translated translatable user interface element in the user interface of the web application;
highlighting the translated user interface element on the rendered user interface;
providing selectable different proposals for the highlighted user interface element;
receiving a selection by a user of one of the different proposals;
receiving an edit from the user to the selected proposal to improve the translation of the translated user interface element and future translations; and
updating the rendered user interface based on the edit to the selected proposal.

11. The computer implemented method of claim 10, wherein the translatable user interface element is defined at least by a developer while developing the web application and a user of the web application.

12. The computer implemented method of claim 10, wherein the dynamic metadata comprises at least one of specific domain information, a text type, part-of-speech, terminology, context-based information associated with the web application, and information derived from Mockups.

13. The computer implemented method of claim 10, wherein the translatable user interface element comprises a text segment, an image file, an audio clip, a video clip, files, 3D graphics or any combination thereof.

14. The computer implemented method of claim 10, further comprising:
providing an editable list of translatable user interface elements and associated translated user interface elements associated with the web application.

15. The computer implemented method of claim 10, further comprising:
storing the dynamic metadata in a metadata repository and the translated user interface element in a translation repository associated with a user.

16. A computing system to provide instant translation of user interfaces of a web application, comprising:
at least one processor; and
one or more memory devices communicative with the at least one processor, wherein the one or more memory devices store instructions to:
receive a request to translate a user interface of the web application from a source language to a target language;
determine a translatable user interface element associated with the user interface;
translate the translatable user interface element from the source language to the target language based on dynamic metadata associated with the translatable user interface element;
render the translated translatable user interface element in the user interface of the web application;
highlight the translated user interface element on the rendered user interface;
provide selectable different proposals for the highlighted user interface element;
receive a selection by a user of one of the different proposals;
receive an edit from the user to the selected proposal to improve the translation of the translated user interface element and future translations; and
update the rendered user interface based on the edit to the selected proposal.

17. The computing system of claim 16, wherein the translatable user interface element is defined at least by a developer while developing the web application and a user of the web application.

18. The computing system of claim 16, wherein the dynamic metadata comprises at least one of specific domain information, a text type, part-of-speech, terminology, context-based information associated with the web application, and information derived from Mockups.

19. The computing system of claim 16, further comprising:

provide an editable list of translatable user interface elements and associated translated user interface elements associated with the web application.

20. The computing system of claim 16, further comprising:
store the dynamic metadata in a metadata repository and the translated user interface element in a translation repository associated with a user.

* * * * *